Dec. 24, 1957     G. R. GILLIAM     2,817,156
PROCESS FOR EVAPORATING NITRAPHOSPHATE SLURRIES
Filed April 27, 1955
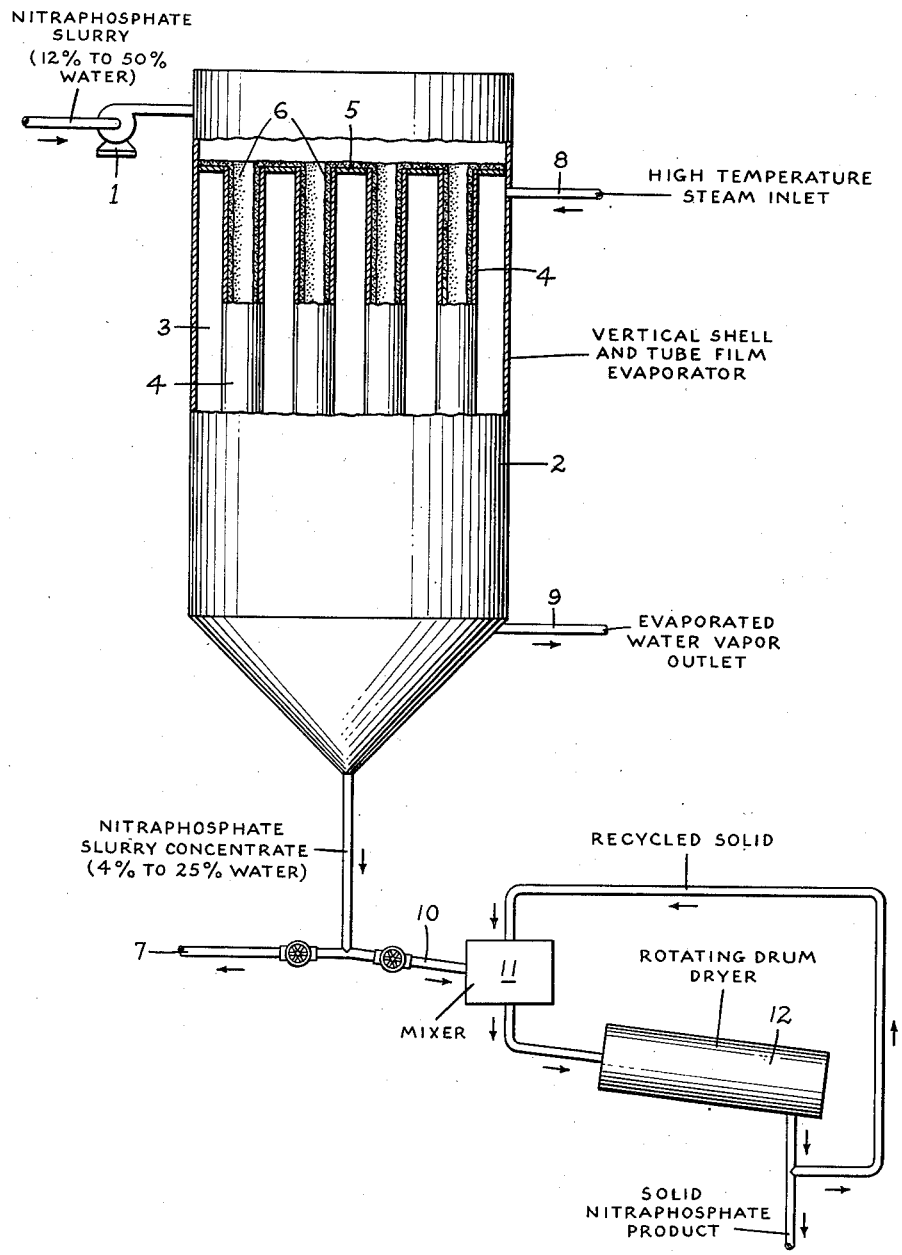
INVENTOR
GEORGE R. GILLIAM
BY
ATTORNEY

United States Patent Office 2,817,156
Patented Dec. 24, 1957

2,817,156

PROCESS FOR EVAPORATING NITRA-PHOSPHATE SLURRIES

George R. Gilliam, Prince George County, Va., assignor to Allied Chemical & Dye Corporation, New York, N. Y., a corporation of New York Application April 27, 1955, Serial No. 504,355

5 Claims. (Cl. 34—39)

This invention is directed to a process for evaporating ammoniated nitraphosphate slurries prepared by acidulating phosphate rock with nitric acid alone or together with sulfuric or phosphoric acids, followed by ammoniation of the acidulated material and, if desired, addition of other fertilizer ingredients such as potash salts, phosphate salts and nitrogen-containing salts.

Numerous processes have been described for the preparation of nitraphosphate fertilizers by acidulation of phosphate rock with aqueous acid solutions and ammoniation of the acidulated product to form an aqueous slurry. Additional materials are frequently incorporated with the acidulated material, especially potash salts to provide this fertilizer element and ammonium or phosphate salts to increase the nitrogen and $P_2O_5$ content of the product and to permit preparing products with differing ratios of the three primary plant food elements, phosphorus, nitrogen and potassium. In addition, compounds containing desirable trace elements, such as iron and magnesium, or fillers, may be added to the slurry. In general, nitraphosphates are prepared from phosphate rock, with or without triple superphosphate, by acidulation with nitric acid or with a mixture of acids consisting of nitric and sulfuric acids, nitric and phosphoric acids, or nitric, sulfuric, and phosphoric acids employing about seven to about twenty, preferably from about nine to sixteen, equivalents of mixed acid per mol of $P_2O_5$ in the rock. Nitric acid is considered to be a monobasic acid and phosphoric and sulfuric dibasic. Of the mixed acids from about 40 to 90 percent, preferably from about 60 to 85 percent of the equivalents of acid is nitric acid.

The nitraphosphate slurries thus produced, containing the supplemental additions when made, usually contain about 12%–30% water, practically all of which must be evaporated to obtain suitably dry products for marketing. Two characteristics of these slurries have presented serious problems in developing suitable evaporating methods. First, prolonged heating of the slurries at high temperatures leads to decomposition and loss of valuable fertilizing material. Secondly, the presence of large amounts of highly water soluble salts, particularly the ammonium salts, causes the slurries to pass through a very viscous, sticky stage as their water content is reduced by evaporation. Direct-fired rotary drum driers have heretofore been employed using heating gases at very high temperatures to reduce the "fouling" of the interior of the dried surfaces by the concentrated materials being processed. It also has been usual to provide scrapers to remove material adhering to the drier walls. Another expedient has been to employ such rotary drum driers for the partial evaporation of the slurries to a water content in the range 12%–18%, for example. The partially evaporated material is blended with recycled dried product in amount sufficient to reduce the water content of the mixture to, for example, 4%–6% water. The mixture with this lowered water content then may be further dried in a conventional rotary drier to about 2% water or less desired in the final fertilizer product.

In developing processes of the described types it was found during evaporation of the nitraphosphate slurries in rotary drum driers there was a substantial loss of nitrogen which it appears can not be reduced when operating on a commerical scale. With a chloride salt present the nitrogen losses become even greater so it is not practicable to employ this type of evaporation when the materials treated contain potassium chloride as a source of $K_2O$.

Design of rotary driers with capacities of the order of 15–30 tons per hour such as should be provided for economical commercial operation, appears to be difficult, if not impossible, for handling those compositions which contain or form solids during their concentration and require blades to scrape off solid adhering to the evaporator wall. Holding liquid concentrate in a rotary drier or disposing of such concentrate at times of mechanical failure of the drier or equipment associated therewith, presents a difficult problem. Further, the evaporation of water from the nitraphosphate slurries in rotary drum driers is unexpectedly sensitive to scaling up the size of the driers. For example, slurries with added recycle, containing about 30% liquid phase, which had been successfully dried in rotary driers of the size used in small pilot plant work, having internal diameters up to 1 foot, fouled rotary driers having internal diameters of about 8 feet and larger, under the same or similar operating conditions. The size drier which could be used was particularly affected by composition of the solids content, amount of water in the slurry feed and temperature of the material passing through the drier.

It is an object of my invention to provide a process whereby the ammoniated nitraphosphate slurries may be evaporated to a relatively low water content by a procedure adapted to large-scale commercial production without undue fouling of the equipment used, and this may be accomplished with a minimum time of exposure of the heat-sensitive material to high temperatures. The short time of exposure to high temperatures obtained by employing the evaporation procedure of my invention, minimizes decomposition and loss of fertilizer values in the final product.

I have discovered the ammoniated nitraphosphate slurries are sufficiently thixotropic that when the water content of such slurries has been reduced to about 4% to 25%, with which water content the material normally would become solid or relatively viscous at 100° C., under vigorous agitation they remain fluid and mobile at temperatures of about 100° C. and higher. Despite this property of the slurries, the conditions present in rotary type driers impose limitations on the point to which the water content of the nitraphosphate material may be reduced such that in many cases it is impracticable to employ this type drier to evaporate the desired amount of water from the slurry feed, without solid formation interfering with proper operation of the drier. If sufficiently high temperatures are maintained to prevent solid deposition, there is the attendant decomposition of the heat-sensitive material, which is promoted by the relatively long time exposure of the material to the high temperatures.

I have now discovered the conditions with respect to agitation of the ammoniated nitraphosphate slurries in film evaporators operated under certain conditions characterizing my invention are such that these materials remain fluid while being dried to a desired lowered water content, and decomposition is minimized by the shorter time of exposure to the less elevated temperatures than required in using rotary drum type driers heretofore considered most suitable for removing water from such slurries.

In operating in accordance with my invention, an ammoniated nitraphosphate slurry containing 12% to 50% water is evaporated to reduce its water content to within the range 4% to 25% water by film evaporation in which heat is supplied for evaporation of water from the slurry by indirect heat transfer from a heating medium at temperatures above 100° C. through heat transfer surfaces over which the slurry flows at a rate of 420 to 3000 lbs. of slurry/hour/foot of heat transfer surface transverse to flow of the film and no more than 60 seconds retention time in contact with those surfaces. Preferably, the slurry is passed at a rate of 600 to 2100 lbs. of slurry/hour/foot of heat transfer surface transverse to flow of the film and 5 to about 30 seconds retention time in contact with heat transfer surfaces heated at 110°–230° C., the slurry initially containing about 15% to about 30% water and being evaporated to a water content of about 4% to about 10%. The rates of flow given are based on the weight of slurry fed to the evaporator. Further, in a tubular evaporator in which the slurry flows in contact with one or more heat transfer surfaces formed by the inner or outer surfaces of the tubes these rates of flow are based on the pounds slurry per hour per perimetric foot of total heat transfer surface over which the slurry flows.

Of the above conditions characterizing the process of my invention, for all practical purposes the rate of feed and retention time define the film thickness for any particular apparatus used for evaporating the slurry. Hence, they characterize the process as a film evaporation under conditions of turbulence of the slurry which I have found effectively maintains it as a mobile fluid while flowing over the heat exchange surfaces and undergoing concentration. If desired, the agitation of the film of slurry and its mobility and uniform distribution over the heat exchange surfaces, may be increased by providing means for vibrating those surfaces. Quick removal of the concentrate from the evaporator, supplemented if necessary by induced agitation of the concentrate, prevents blocking of the evaporator draw-off lines by solids forming therein.

To aid in the evaporation of the water, a current of inert gas having a low water vapor pressure with respect to the water vapor pressure of the material undergoing evaporation may be passed over the free surfaces of the film of material. I prefer to operate the process of my invention with this supplemental evaporation of water by means of such an inert gas supplied at a temperature about that of the heating medium in contact with the heat transfer surfaces.

A vertical, falling film evaporator provides effective conditions for carrying out the process of my invention. Accordingly, in the following examples illustrating specific conditions employed in evaporating specific ammoniated nitraphosphate slurries, the operation of a falling film type evaporator will be described. An evaporator of this type with a tube diameter of 1" to 6" and tube length of 10 ft. to 45 ft., preferably 2" to 4" and 10 ft. to 30 ft., respectively, is effective for evaporating nitraphosphate slurries in accordance with my invention. Other means may be employed to provide the evaporation conditions characterizing my invention as set forth above. Accordingly, the invention is not limited to the use of a falling film type evaporator. Nor is the invention limited to evaporating the specific slurries described in the examples or employing the specific evaporating conditions of the examples. It is suitable for evaporating any ammoniated nitraphosphate slurry.

The accompanying drawing illustrates the process of this invention employing a vertical shell and tube film evaporator, which is shown partly in cross section, to produce a slurry concentrate and, when desired, to further treat the concentrate to obtain a dried solid product. With reference to the drawing, the aqueous nitraphosphate slurry is fed by pump 1 into the top of film evaporator 2. This evaporator comprises a steam chamber 3 traversed by a bundle of heat transfer tubes 4 whose upper ends are fixed in an upper tube sheet 5 and a lower tube sheet. This lower tube sheet and other conventional features of an evaporator of this type are not shown in the drawing. The aqueous nitraphosphate slurry entering the evaporator is distributed over the upper tube sheet and thence flows into the several tubes and downwardly over the interior surface of each of tubes 4 as a film of the material 6 flowing along substantially vertical lines of flow downwardly over the tube surfaces to the bottom of the evaporator from which the nitraphosphate concentrate is withdrawn through a pipe 7. High temperature steam is supplied to chamber 3 through inlet 8 to serve as the heating medium for evaporation of water from the slurry, and this water is taken off through outlet 9 as water vapor.

To obtain a dried solid nitraphosphate, the slurry concentrate is preferably withdrawn through pipe 10 and is mixed in mixer 11 with dried solid recycled from a rotating drum drier 12 in which the mixture of slurry concentrate and recycled dried solid is dried. The excess of the dried mixture over that recycled is withdrawn as solid product.

*Example 1.*—A typical procedure for the production of an ammoniated nitraphosphate slurry is described in Example 2 of U. S. P. 2,680,680 to Gordon A. Coleman, which issued June 8, 1954. An ammoniated nitraphosphate slurry containing 18% water is prepared in accordance with that example by treating phosphate rock with nitric, phosphoric and sulfuric acids, ammoniating the acidulated product containing 32% water and adding potassium chloride to the ammoniated material. The following proportions of the several materials are employed in carrying out this process:

| | Pounds |
|---|---|
| Phosphate rock (34% $P_2O_5$) | 36 |
| Nitric acid (42% $HNO_3$) | 67.5 |
| Phosphoric acid (85% $H_3PO_4$) | 5.7 |
| Sulfuric acid (94.7% $H_2SO_4$) | 22 |
| Ammonia | 11.9 |
| Potassium chloride (62.5% $K_2O$) | 24.6 |

Slurry thus produced, containing 18% water, is fed at a temperature of 120° C. to a failling film evaporator at the rate of 49,800 lbs./hr. The evaporator is a conventional type, film evaporator comprising a steam jacket containing a bundle of heat transfer tubes, with provision made for distributing the mobile material to be evaporated over the interior surfaces of these tubes. The slurry flows downwardly over the tube surfaces to the bottom of the evaporator, from which the concentrated material is withdrawn. Steam is supplied to the jacket as the heating medium contacted with the exterior surfaces of the heat transfer tubes. A more detailed description and illustration of this conventional type falling film evaporator is given in "Chemical Engineering," vol. 60, No. 4, pages 231–232, April 1953.

Carrying out the process of this example in an evaporator having 39 tubes of 3¼" I. D. and a total tube surface of 654 sq. ft., and evaporating water from the slurry at the rate of 5300 lbs./hr., the rate of passage of slurry over the heat exchange surfaces is 1500 lbs./hour/perimetric foot of tube surface. The retention time in contact with those surfaces is about 25 seconds. The slurry concentrate leaves the evaporator containing about 8.3% water, at the rate of 44,500 lbs./hr. and at a temperature of about 130° C., with steam supplied to the evaporator jacket at about 185° C.

Further water removal is accomplished by first mixing the slurry concentrate at about the temperature at which it leaves the evaporator, with recycled dried product at a temperature of 50° C. in the ratio of 2.5 lbs. of recycled product to 1 lb. of slurry concentrate. This mixture, containing about 17.5% liquid phase, is passed through direct-fired rotary drum driers having internal diameters of 8½ feet, in which its moisture content is reduced to less than 2%. The heating gas passes through the drier cocurrently to the slurry concentrate, so that at the inlet end of the drier temperatures of 350–375° C. are maintained at which the liquid phase present in the fertilizer mixture amounts to no more than 28%. This dried material preferably is screened to obtain product of the desired particle size. The off-size material and as much of the product size material as may be necessary to provide the desired recycle ratio, is recycled as the dried product which is mixed with slurry concentrate from the film evaporator prior to further evaporation of moisture in the rotary drier. Before being mixed with the slurry, the larger size material to be recycled is ground or otherwise comminuted.

By modifying the process of this example to employ an evaporator containing 37 tubes of 3¼" I. D. and a total of 925 sq. ft. of tube surface to which 68,300 lbs. of the ammoniated nitraphosphate slurry is fed per hour and from which about 7500 lbs./hr. of water is evaporated, a concentrated slurry containing about 7.9% water is drawn from the film evaporator at the rate of about 60,800 lbs./hr. The slurry concentrate is cooled from 130° C., at which it leaves the film evaporator, to 100° C., and is mixed with recycled dried product at 50° C. in a recycle ratio of 2.0 lbs. dried product per pound of slurry concentrate. A mixture containing 19.5% liquid phase is thus obtained suitable for feeding to the rotary drier employing a lower recycle ratio than in the preceding operation. This modification employs a film evaporator containing about 41% greater heat transfer area, a somewhat higher liquid phase in the mixture fed to the rotary drier and a rate of passage of slurry over the heat exchange surfaces of about 2180 lbs./hour/perimetric foot of heat transfer surface contacted by the slurry. The resulting reduction in recycle ratio results in a 25% increase in the rate of production of the final dried product.

If, instead of evaporating water from the 18% ammoniated nitraphosphate slurry by the processes of this example, the slurry containing 18% water is mixed with sufficient dried product to produce a feed of about 19.5% liquid phase for the rotary drum drier, a recycle ratio of about 6.4 lbs. dried product for every 1 lb. of slurry is required.

*Example 2.*—An ammoniated nitraphosphate slurry containing 14.9% water is prepared in accordance with the process of Example 1 of above U. S. P. 2,680,680, by treating phosphate rock and triple superphosphate with a mixture of nitric and sulfuric acids, and ammoniating the acidulated product with addition of supplemental water and potassium chloride. The following proportions of the several materials are employed in carrying out this process:

| | Pounds |
|---|---|
| Phosphate rock (34% $P_2O_5$) | 628 |
| Triple superphosphate (48% $P_2O_5$) | 62.8 |
| Nitric acid (50% $HNO_3$) | 1033 |
| Sulfuric acid (93.7% $H_2SO_4$) | 253 |
| Ammonia | 156.8 |
| Potassium chloride | 408 |

Slurry thus produced is fed to a falling film evaporator at a temperature of 110° C. at the rate of 1575 lbs. slurry/hour/perimetric foot of heat transfer surface contacted by the slurry. An evaporator with a tube 3¼" internal diameter and 11½ ft. long and containing a total of 9.8 sq. ft. tube surface, is employed, with steam in the heating jacket surrounding the tubes at 191° C. The retention time of slurry in contact with the heat transfer surfaces is about 15 secs. Under these conditions, a slurry with a water content of 13.4% leaves the film evaporator at a temperature of 128° C.

*Example 3.*—While the procedure of Example 2 illustrates conditions under which it might be desirable to operate the process of my invention in special circumstances, the following modification of this procedure represents a preferred operation to recover a final dried product: More water is introduced to produce an ammoniated nitraphosphate slurry containing 17.4% water. This slurry is fed to the falling film evaporator at a temperature of 110° C. at the rate of 719 lbs. slurry/hour/perimetric foot of tube surface. Steam is supplied to the heating jacket at 166° C. A cocurrent flow of 65 cu. ft./min. of air heated to 165° C. is introduced at the top of the evaporator and is passed downwardly through the tubes in contact with the exposed surface of the film of nitraphosphate slurry flowing downwardly over the tube surfaces. The retention time of slurry in contact with the heat transfer surfaces is about 7 secs. Under these conditions, a slurry concentrate leaves the evaporator at 106° C. having a water content of 6.5%.

By adding finely divided recycled product containing about 1% water and at 50° C., with the slurry concentrate at about the temperature at which it leaves the evaporator, a mixture containing 3.75% water and about 22.5% total liquid phase is obtained which is especially suitable for drying in a direct-fired rotary drum drier.

As shown by the foregoing Example 3, the evaporation of water from the slurry by heat transferred from the evaporator heating medium to the film flowing over the heat transfer surfaces may be supplemented to any desired degree by heat introduced in a gas passed in contact with the film of material undergoing evaporation. Also, with or without supplementing the heat supply in this manner, a gas of lower water vapor pressure than the water vapor pressure of the material undergoing concentration may be passed in contact therewith to promote the evaporation of water from the nitraphosphate slurry fed to the film evaporator. While the temperature of such gas may be below 100° C., it should not be cooled enough to chill the film to a point below that at which the film ceases to flow at the required rate over the heat transfer surfaces. The gas may be passed in countercurrent or cocurrent flow with the slurry undergoing evaporation. With countercurrent flow, the velocity of the gas should not be high enough to unduly impede the flow of slurry. With cocurrent flow, means may be provided to impart a high velocity to the gas to increase the rate of flow of slurry over the heat transfer surfaces. Higher temperatures may then be maintained to increase the rate of evaporation of the water. On the other hand, conditions with respect to rate of feed of slurry to the film evaporator and temperature of the heating medium maintained in contact with the heat transfer walls of the film evaporator may be so chosen that the desired amount of water is vaporized from the evaporator feed without the supplemental evaporation provided by passing an inert gas in contact with the free surface of the film of material undergoing evaporation.

While the invention has been illustrated by examples employing vertical tube falling film evaporators, the choice as to the type of film evaporator which will be used in carrying out the invention is governed only by the necessity that the film of slurry undergoing evaporation be in constant rapid motion throughout the time it is passing through the evaporator under the conditions set forth above characterizing the invention. Other conditions to be maintained in any such evaporator to accomplish the desired removal of water from a nitraphosphate slurry, such as heat transfer areas, temperature of treating medium, etc., are determined by computations which can be made by any skilled chemical engineer.

An important aspect of my invention is in the combination of film evaporation of the nitraphosphate slurry to a point at which addition of a relatively small proportion of recycled dried material gives a suitable feed for large-sized, rotary drum driers in which the water content of the nitraphosphate concentrate is further reduced to no more than about 2%. In this combined two-step evaporation procedure, the water content of the initial slurry should be reduced to a point at which the maximum amount of liquid phase in the mixture of recycled product and slurry concentrate undergoing further drying in the rotary drum drier is in the range about 16% to about 28%, preferably 17% to 25%, under the conditions maintained in the second drying step.

I claim:

1. The process for evaporating water from an ammoniated nitraphosphate slurry containing 12% to 50% water which comprises passing said slurry to and permitting it to flow under the influence of gravity over heat transfer surfaces as a falling film of material flowing along substantially vertical lines of flow in contact with said surfaces, said slurry being passed to and over said heat transfer surfaces at a rate in the range 420 lbs. to 3000 lbs. of slurry/hour/foot of heat transfer surface transverse to flow of the film and a retention time of the slurry in contact with said surfaces of no more than 60 secs., supplying heat to said slurry at a rate at which the slurry is concentrated to a water content of 4% to 25%, and supplying said heat, at least in part, by indirect heat transfer through said heat transfer surfaces from a heating medium at temperatures above 100° C.

2. The process of claim 1 wherein the slurry is passed to and over the heat transfer surfaces at a rate of 600 lbs. to 2100 lbs. of slurry/hour/foot of heat transfer surface transverse to flow of the film and the retention time of the slurry in contact with said surfaces is no more than 30 secs.

3. The process of claim 2 in which the heat for evaporation of water from the slurry supplied by indirect heat transfer through the heat transfer surfaces over which the slurry passes, is supplemented by passing an inert gas containing a low water vapor pressure with respect to the water vapor pressure of the material undergoing evaporation over the free surfaces of the film passing over the heat exchange surfaces.

4. The process for producing a dry, solid fertilizer product from an ammoniated nitraphosphate slurry containing 12% to 50% water which comprises passing said slurry to and permitting it to flow under the influence of gravity over heat transfer surfaces as a falling film of material flowing along substantially vertical lines of flow in contact with said surfaces, said slurry being passed to and over said heat transfer surfaces at a rate in the range 420 lbs. to 3000 lbs. of slurry/hour/foot of heat transfer surface transverse to flow of the film and a retention time of the slurry in contact with said surfaces of no more than 60 secs., supplying heat to said slurry at a rate at which the slurry is concentrated to a water content of 4% to 25%, and supplying said heat, at least in part, by indirect heat transfer through said heat transfer surfaces from a heating medium at temperatures above 100° C., and thereafter mixing the ammoniated nitraphosphate slurry concentrate thus produced with recycled, dry, solid product and drying the resulting mixture in a rotary drum drier to a water content of no more than 2%, said mixture containing a ratio of recycled product to slurry concentrate such that the maximum amount of liquid phase in the mixture undergoing the drying in said rotary drum drier is in the range 16% to 28%.

5. The process of claim 4 wherein the slurry is passed to and over the heat transfer surfaces at a rate of 600 lbs. to 2100 lbs. of slurry/hour/foot of heat transfer surface transverse to flow of the film and a retention time of the slurry in contact with said surfaces of no more than 30 secs., and the ratio of recycled product to slurry concentrate in the mixture subjected to drying in the rotary drum drier is such that the maximum amount of liquid phase in the mixture undergoing the drying in said rotary drum drier is substantially 17% to 25%.

References Cited in the file of this patent

UNITED STATES PATENTS

| | | |
|---|---|---|
| 1,551,965 | Muller | Sept. 1, 1925 |
| 2,493,218 | Bergstrom | Jan. 3, 1950 |
| 2,717,458 | Shabaker | Sept. 13, 1955 |